United States Patent
Barnes et al.

(10) Patent No.: US 9,193,467 B2
(45) Date of Patent: Nov. 24, 2015

(54) SUSPENSION FOR AN ENGINE ON AN AIRCRAFT STRUT INCLUDING A SUSPENSION ARCH

(75) Inventors: Emily Barnes, Paris (FR); Pierre-Alain Jean-Marie Philippe Hugues Chouard, Melun (FR)

(73) Assignee: SNECMA, Paris (FR)

( * ) Notice: Subject to any disclaimer, the term of this patent is extended or adjusted under 35 U.S.C. 154(b) by 551 days.

(21) Appl. No.: 13/243,420

(22) Filed: Sep. 23, 2011

(65) Prior Publication Data

US 2012/0085859 A1      Apr. 12, 2012

(30) Foreign Application Priority Data

Oct. 7, 2010    (FR) ..................... 10 58143

(51) Int. Cl.
    *B64D 27/26*    (2006.01)
    *B64D 27/00*    (2006.01)

(52) U.S. Cl.
    CPC .......... *B64D 27/26* (2013.01); *B64D 2027/266* (2013.01)

(58) Field of Classification Search
    CPC .. B64D 27/26; B64D 27/00; B64D 2027/266; B64D 2027/262; B64D 27/023; B64D 2027/268; B64D 29/005; B64D 27/18; F02C 7/20; Y02T 50/54
    USPC ................ 244/54, 131, 53 R; 248/554–557; 60/796, 797
    See application file for complete search history.

(56) References Cited

U.S. PATENT DOCUMENTS

| | | | |
|---|---|---|---|
| 2,944,766 A * | 7/1960 | Varhanik et al. | 244/54 |
| 4,634,081 A * | 1/1987 | Chee | 244/54 |
| 5,127,606 A | 7/1992 | Chan et al. | |
| 5,226,288 A | 7/1993 | Cornax | |
| 5,860,623 A * | 1/1999 | Dunstan et al. | 244/54 |
| 6,209,822 B1 | 4/2001 | Le Blaye | |
| 7,021,585 B2 * | 4/2006 | Loewenstein et al. | 244/54 |
| 7,527,220 B2 * | 5/2009 | Dron | 244/54 |
| 2004/0251381 A1 | 12/2004 | Pasquer et al. | |
| 2012/0012694 A1 * | 1/2012 | West | 244/54 |

FOREIGN PATENT DOCUMENTS

| | | |
|---|---|---|
| EP | 0 940 337 A | 9/1999 |
| EP | 1 481 896 A1 | 12/2004 |
| GB | 2013786 A | 8/1979 |
| WO | WO 92/08642 A1 | 5/1992 |

OTHER PUBLICATIONS

French Preliminary Search Report and Written Opinion issued on May 27, 2011 in corresponding French Application No. 10 58143 filed on Oct. 7, 2010 (with an English Translation of Categories).

* cited by examiner

*Primary Examiner* — Tien Dinh
*Assistant Examiner* — Vicente Rodriguez
(74) *Attorney, Agent, or Firm* — Oblon, McClelland, Maier & Neustadt, L.L.P.

(57) ABSTRACT

A suspension for an engine on an aircraft strut is disclosed. The suspension includes a beam with a plate provided with a fixing device for fixing to the strut; and a suspension arch linked to the beam by at least one pivot link whose axis is intended to be parallel to the axis of the engine. The suspension arch having, at each of its ends, a fixing device for fixing to a case of the engine.

7 Claims, 2 Drawing Sheets

SUSPENSION FOR AN ENGINE ON AN AIRCRAFT STRUT INCLUDING A SUSPENSION ARCH

BACKGROUND OF THE INVENTION

1. Field of the Invention

The present invention relates to the field of jet engines and targets the suspension of the latter on the structure of the aircraft that they propel.

2. Description of the Related Art

A propulsion engine, such as a jet engine, can be mounted at various points on the aircraft by attachment to a strut or a pylon belonging to the structure thereof. It can thus be fixed to the wings, to the fuselage, generally at the rear, or mounted in the tail group by appropriate attachment means. The function of these attachment means is to ensure the transmission of the mechanical forces between the engine and the structure of the aircraft.

The loads to be taken into consideration are oriented in the three main directions of a coordinate system linked to the engine. These are, in particular, in normal operation, the weight of the engine on the vertical axis Z, its thrust on the axis X of the engine, and the lateral aerodynamic loads on the transversal axis Y. The loads to be transmitted also include the take-up of the rotational torque around the axis X of the engine. These means must also allow for the deformations undergone by the engine during the different phases of the flight resulting, for example, from the dimensional variations due to the thermal stresses.

The link between the engine and the strut is usually provided, for fan engines, by two suspension planes, one at the front of the engine, on the intermediate case, the other at the rear. Each of the suspension means is arranged to transmit a portion of the forces. For example, one of the suspensions, called front suspension, takes up or transfers the lateral forces on the axis Y and vertical forces on the axis Z, and that of the engine torque around the axis X. The other suspension, called rear suspension, transmits to the strut of the aircraft the lateral and vertical forces. The axial forces can be taken up by one of these two planes. Such a suspension is isostatic.

With reference to FIG. 1, there is known, through the application EP1707487 A1 from the company SNECMA, a rear suspension 1 comprising a beam 11, possibly double, fixed to the strut by bolts and linked to the case of the engine by link rods 12. The link rods 12 swivel at their ends on clevises or cleats, depending on the mounting, which are attached respectively to the engine case and to the beam 11. This suspension 1 transmits the forces and the moment on the axis Y and the forces and the moment on the axis Z.

In order for the transmission of the forces by the link rod 12 to be purely axial, that is to say, along the axis of the link rods, a swivel bearing 13 is provided at each end of the link rods 12. This mounting makes it possible in particular to absorb the radial and axial expansions of the engine.

The safety constraints also stipulate the presence on this suspension of means mitigating the failure of a force transmission member. Thus, there are usually provided for this purpose link means with play, said to be on standby, which become active by absorption of the play and transmit the forces via a backup pathway, if one of the transmissions fails following a part breakdown. Still referring to FIG. 1, the rear suspension 1 includes a safety link 14 linked at its end to the beam 11 by a swivel-type bearing 13.

Because of the swivel links 13 that the beam 11 has, said beam has a large lateral dimension in the direction Y which disturbs the circulation of the airstream in which the suspension is placed, and in particular the secondary stream for a bypass engine. For a suspension, a beam width D, represented in FIG. 1, is defined, which corresponds to the smallest lateral dimension of the beam 11 which is situated in the airstream. The greater the width D of the beam 11, the more the aerodynamic efficiency of the engine is reduced.

Several beam shapes have been considered for reducing the width D of the beam, but these tests have come to nothing. The swivel-jointed links, which are positioned on the beam, impose a minimum lateral dimension. One immediate solution would be to place them vertically. This is difficult given the fact that the height of the beam is limited. In fact, it depends on the constraints of wing height and engine height relative to the ground which are predetermined. In other words, the current solutions do not allow for the incorporation of swivel-jointed links in a beam whose dimensions are reduced both widthwise and heightwise.

BRIEF SUMMARY OF THE INVENTION

In order to eliminate at least some of these drawbacks, the invention relates to a suspension for an engine on an aircraft strut, the suspension comprising a beam with a plate provided with fixing means for fixing to said strut and a suspension arch linked to the beam by at least one pivot link whose axis is intended to be parallel to the axis of the engine, the suspension arch having, at each of its ends, fixing means for fixing to a case of the engine.

The advantage of the suspension arch is that it allows for a take-up of the forces with a larger lever arm on the case of the engine compared to a suspension according to the prior art. This advantageously makes it possible to lower the load level in the fixing means for fixing to the engine, for example in the link rods.

The suspension according to the invention makes it possible to move the links of the beam away towards the suspension arch. The result of this is that the dimensions of the beam can be reduced by comparison to a beam according to the prior art which advantageously makes it possible to limit the aerodynamic disturbances of the airstream in which the suspension is placed. Thus, the aerodynamic lines at the suspension level, called bifurcation lines, are narrow which testifies to an aerodynamic optimization of the suspension. For a bypass engine, the arch is advantageously positioned in the secondary airstream circulating between the wing of the aircraft and the engine.

Preferentially, the suspension arch is linked to the beam by a single pivot link. The presence of a single pivot link makes it possible to have a beam with a very much smaller width.

Preferentially, the beam has a plane of symmetry to allow for an attachment under the wing of the aircraft. Preferably, the plane of symmetry extends perpendicularly to the plane defined by the wing and passing through the axis of the engine.

According to one aspect of the invention, the beam is in the form of a trapezoid, preferably an isosceles trapezoid. The trapezoid shape of the beam is made possible by the presence of the suspension arch which links the engine to the beam. The trapezoid form advantageously makes it possible to limit the aerodynamic disturbances of the beam while making it possible to house the pivot link linking the beam to the arch. The dimensions of the bases of the trapezoid are advantageously reduced to enhance the aerodynamic behaviour.

Also preferentially, the suspension arch has, at a first end, at least one lug intended to be fixed to the case of the engine to form a pivot link whose axis is parallel to the engine axis.

Preferentially, the suspension arch has, at a second end, at least one link rod intended to be fixed to the case of the engine. The link rod advantageously makes it possible to compensate for the thermal expansions of the case of the engine while it is operating. Preferentially, the link rod has swivel joints at both ends.

The combination of a pivot link, on the one hand, and a link rod, on the other hand, at the ends of the arch makes it possible to form an isostatic suspension. The links are strictly sufficient (in number and in nature) to ensure a balance and prevent any rigid displacement of the suspension. The forces applied to the suspension are then perfectly determined which is advantageous and simplifies the design of the suspension.

According to a preferred embodiment of the invention, the suspension arch has an angular aperture of between 25° and 40° and, preferentially, equal to 33°. The greater the open angle of the arch, the better the transmission of the lateral forces. A trade-off is thus provided between the aperture angle and the weight of the arch. The length of the arch makes it possible to add flexibility to the suspension. It goes without saying that the suspension arch could be circumferential) (360°.

Preferentially, the ends of the suspension arch are arranged to be fixed to structural radial arms of the case. Thus, the forces are transmitted directly by structural elements from the engine to the suspension arch which makes it possible to reactively take up any relative displacement of the engine.

Preferably, the invention relates to a rear suspension of an engine on an aircraft strut and an aircraft including such a suspension.

Also preferentially, the arch is mounted between flanges of the engine so as not to protrude from the outer jacket of the engine. Thus, the arch does not disturb the secondary stream.

BRIEF DESCRIPTION OF THE SEVERAL VIEWS OF THE DRAWINGS

The invention will be better understood with the help of the appended drawing in which.

DETAILED DESCRIPTION OF THE INVENTION

The following description relates to a rear suspension 2 of a jet engine on an aircraft strut 100, but the invention similarly applies to a front suspension. The rear suspension 2 is represented in the orthogonal coordinate system (X, Y, Z) represented in FIGS. 2 and 3 in which the axis X corresponds to the axis of the engine oriented from upstream to downstream, the axis Y corresponds to the lateral axis oriented from right to left and the axis Z corresponds to the vertical axis oriented from bottom to top.

Figure 1:
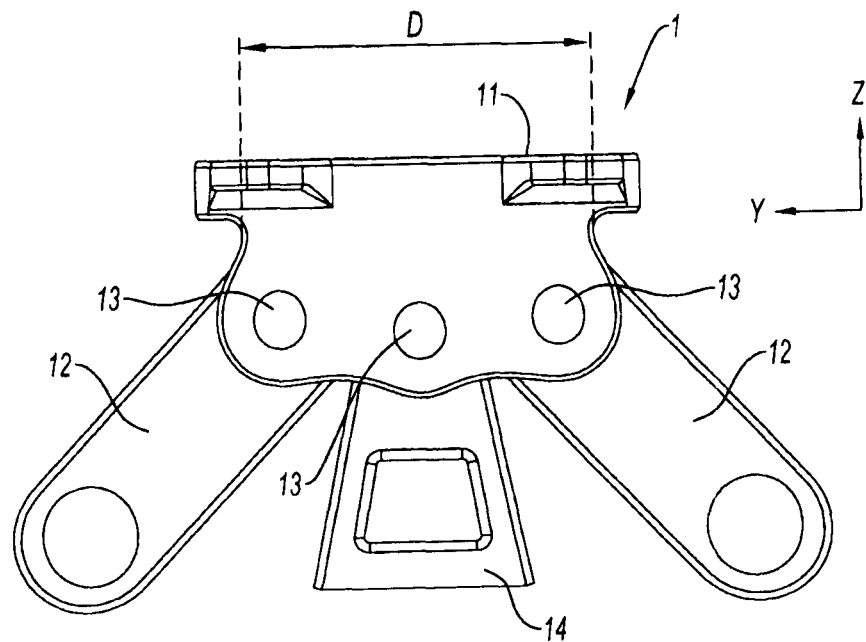
FIG. 1 is a front view of a rear suspension according to the prior art (already discussed)
Figure 2:
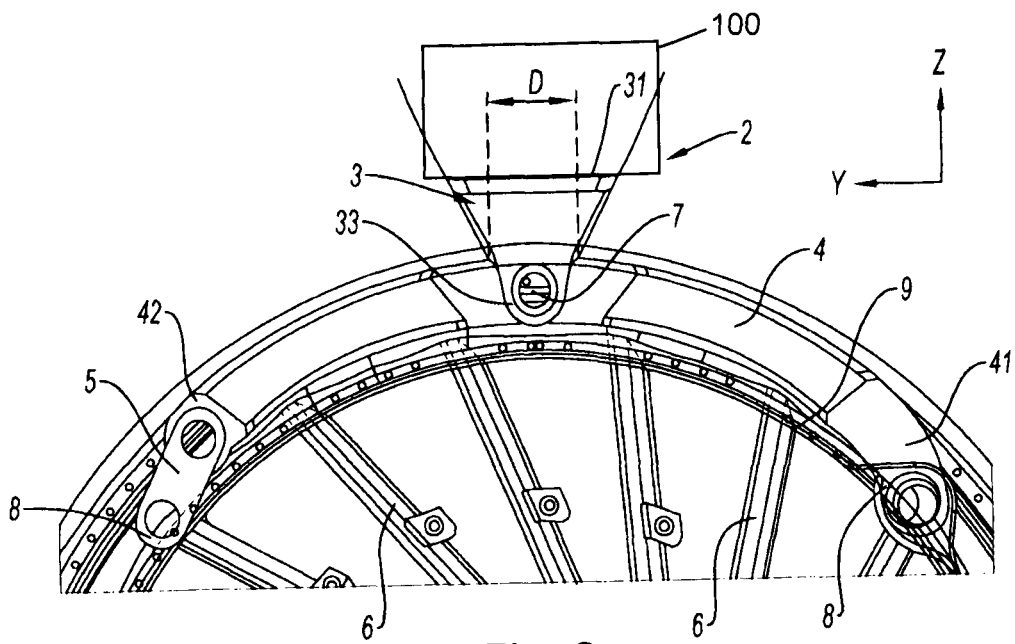
FIG. 2 is a front view of a rear suspension according to the invention, the suspension being linked to the case of the engine.
Figure 3:
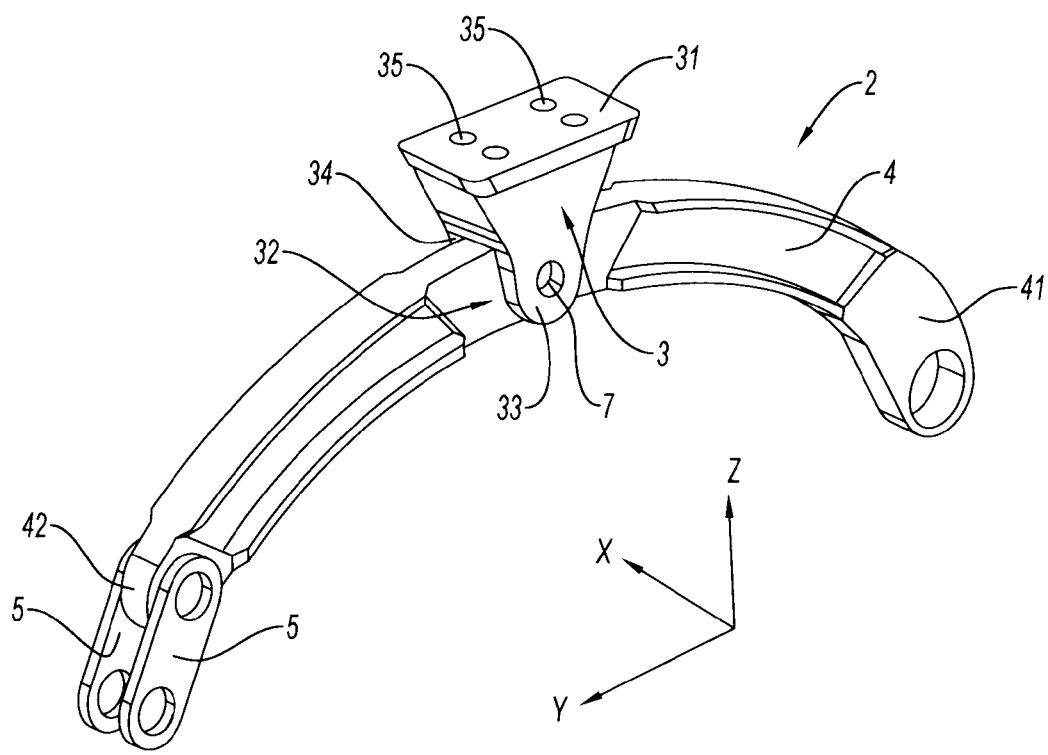
FIG. 3 is a perspective view of the rear suspension of FIG. 2.

As can be seen in FIGS. 2 and 3, the rear suspension 2 comprises a beam 3 for fixing to the strut or pylon of the aircraft and an arch 4, attached to the beam 3, which has, at its ends, fixing means for fixing to a case of the engine, in this case the exhaust case 9 of the engine. In the case in point, the suspension 2 is made of an alloy such as inconel 718.

The beam 3 is arranged perpendicularly to the axis X of the engine, that is to say, on the axis Z, and is roughly in the form of an isosceles trapezoid whose height extends radially relative to the axis X of the engine. The beam 3 includes a plate 31 provided with recesses for the passage of appropriate fixing means 35 for fixing to the strut, such as bolts. These means are known per se. The beam 3 is also provided with a clevis 32 to receive a central portion of the arch 4. The clevis 32 has an upstream lug 33 and a downstream lug 34 relative to the direction X of flow of the gases, the arch 4 being inserted between the lugs 33, 34 of the clevis 32 and linked thereto by a pivot link 7 of axis X. In this example, a captive nut is inserted into the lugs 33, 34 of the clevis 32 of the beam and in the central portion of the arch 4 to form the pivot link 7 of axis X as represented in FIGS. 2 and 3. It goes without saying that other means could be appropriate to form the pivot link.

According to a preferred embodiment, the beam 3 has a faring to optimize the circulation of the airstream between the case of the engine 9 and the wing of the aircraft.

The arch 4 has, by definition, an arc shape whose open angle is in this case of the order of 33° but it goes without saying that it could be different. In particular, a circumferential arch 4 could be appropriate. An open angle of between 25° and 40° advantageously makes it possible to support the engine satisfactorily while limiting the weight of the arch 4, an open angle of 33° providing a good trade-off. Because of its length, the arch 4 is flexible and can take up a portion of the loads of the engine without transmitting them to the beam 3.

The arch 4 has a height, defined in the axis Z, configured to minimize the distance between the flanges of the engine and the pylon/strut. Thus, the arch 4 does not disturb the secondary air stream.

As represented in FIGS. 2 and 3, the arch 4 has a right-hand first end 41 and a left-hand second end 42 which respectively have fixing means for fixing to the exhaust case 9 of the engine.

In the case in point, the right-hand first end 41 is in the form of a lug 41 arranged to be linked to an attachment clevis 8 of the exhaust case by a pivot link of axis X as represented in FIG. 2.

The left-hand second end 42 has a link 5 with two swivel joints linking the arch 4 to an attachment clevis 8 of the exhaust case. The link 5 with two swivel joints makes it possible to compensate for the thermal expansions of the exhaust case 9 of the engine while it is operating.

Advantageously, the combination of a pivot link of axis X between the beam 3 and the arch 4, of a pivot link of axis X between the first end 41 of the arch 4 and the case of the engine 9 and of a link by link rods 5 between the second end 42 of the arch 4 and the case of the engine 9 makes it possible to form an isostatic suspension. The links are strictly sufficient (in number and in nature) to ensure a balance and prevent any rigid displacements of the suspension. The forces applied to the suspension are then perfectly determined which is highly advantageous.

It goes without saying that the second end 42 could be linked to the exhaust case 9 by other types of link, for example by a pivot link or swivel joint link. The presence of pivot links at the first and second ends 41, 42 makes it possible to form a rear suspension that transmits forces in a balanced manner, the pivot links not making it possible to compensate for the thermal expansions of the exhaust case 9.

Similarly, it goes without saying that the first end 41 could be linked to the exhaust case 9 by other types of link, for example by a swivel joint link or link rods. The presence of link rods at the first and second ends 41, 42 makes it possible to form a rear suspension that transmits the forces in a balanced manner and that makes it possible to compensate for the thermal expansions of the exhaust case 9.

Still referring to FIG. 2, as an example, the exhaust case 9 of the engine has a circular jacket extending axially and structural arms 6 extending radially from the jacket towards the axis X of the engine. The arch 4 is linked at its ends 41, 42 to attachment clevises 8 which are provided in the extension of the structural arms 6 of the engine on the outer surface of the jacket of the exhaust case 9. Thus, the arch 4 is fixed to the structural arms 6 to ensure a good mechanical strength for the suspension 2. Given the fact that the structural arms 6 are angularly spaced in the case 9 and that the arch 4 is fixed to the outer ends of the structural arms 6, the open angle of the arch 4 is here a function of the angle separating two structural arms 6.

In operation, the suspension 2 is fixed to the strut of the aircraft by screws housed in the orifices 35 of the plate 31, the arch 4 being linked at its ends 41, 42 to the exhaust case 9. By virtue of the different links, the rear suspension 2 is isostatic and makes it possible to take up or transfer lateral forces on the axis Y and vertical forces on the axis Z, as well as the moments on the abovementioned axes. The suspension 2 according to the invention can therefore replace a suspension according to the prior art. Moreover, given that the beam 3 has only a single pivot link 7, the width D of the beam 3 is smaller than in the prior art as represented in FIG. 2. The result of this is a lesser aerodynamic disturbance of the suspension and therefore better aerodynamic efficiency, in particular in terms of fuel consumption.

In an embodiment that is not represented, to ensure a redundancy of the links of the suspension 2, the beam 3 includes a clevis 32 that has more than two lugs aligned axially. For a clevis 32 that has, for example, three lugs, two arches 4 are mounted in the clevis 32 in order to ensure a redundancy of the pivot link 7. Each arch 4 also has a pivot link at one end and link rods at its other end. The suspension is said to be "doubled". Alternatively, a standby clevis can be provided at 12 o'clock (diametrically opposite to the beam) to take up the forces in the event of loss of the link with two swivel joints or of the pivot of the suspension arch.

The suspension 2 thus has an enhanced reliability without increasing the width of the beam 3 and therefore while preserving the aerodynamic characteristics of the suspension. As it happens, the safety links induce an increase in the axial dimension of the suspension without modifying the width D of the beam 3.

The invention also relates to a suspension comprising a beam 3 linked to the arch 4 by more than one pivot link 7. For example, by two pivot links of axis X which are aligned laterally on the axis Y in order to take up the torque from the engine, that is to say, the moment on the axis X. The link between the beam 3 and the arch 4 is then equivalent to a solid link, all the torques and forces received by the arch 4 being transmitted to the beam 3. Unlike a one-piece suspension, the combination of at least two pivot links advantageously makes it possible to compensate for the differential expansions between the beam 3 and the arch 4. Such a suspension with small width is suitable for mounting at the front of the engine, that is to say, as front suspension, in order to take up the engine torque.

The invention claimed is:

1. A rear suspension for an engine on an aircraft strut, the suspension comprising:
    a beam including a plate provided with a fixing device which fixes the beam to said strut, said beam further including a clevis arranged along an axis parallel to an engine axis, said clevis being provided with at least first and second lugs; and
    at least one suspension arch carried by said clevis and having an open angle of between 25 and 40°,
    wherein a central portion of said arch is inserted between the first and second lugs of said clevis such that the arch is linked to the beam by a single pivot link, an axis of the pivot link being parallel to the axis of the engine,
    wherein the suspension arch comprises first an second ends including respectively a first linking device and a second linking which links the respective first or second end of the arch to a case of the engine, and
    wherein at least the second linking device comprises at least one link rod having one end which is fixed to said second end of the arch and one opposite end which is fixed to the case of the engine.

2. The suspension according to claim 1, wherein the beam is in the form of a trapezoid with a height that extends radially relative to the axis of the engine.

3. The suspension according to claim 1, wherein the the first linking device comprises at least one lug intended to be fixed to the case of the engine to form a pivot link with an axis parallel to the engine axis.

4. The suspension according to claim 1, wherein the suspension arch has an open angle equal to 33°.

5. The suspension according to claim 1, wherein the first linking device and the second linking device at the ends of the suspension arch are arranged to be fixed to structural radial arms of the engine.

6. An aircraft including at least one strut and an engine linked to said strut by a rear suspension according to claim 1.

7. The suspension according to claim 1, wherein a captive nut is inserted into the first and second lugs of the clevis and in the central portion of the arch to form the pivot link.

* * * * *